(12) United States Patent
Jeong et al.

(10) Patent No.: US 10,045,388 B2
(45) Date of Patent: Aug. 7, 2018

(54) METHOD AND APPARATUS OF IMPROVING QUALITY OF CALLS IN MOBILE COMMUNICATION SYSTEM

(71) Applicant: Samsung Electronics Co., Ltd., Suwon-si, Gyeonggi-do (KR)

(72) Inventors: Sangsoo Jeong, Suwon-si (KR); Songyean Cho, Seoul (KR); Jinuk Lee, Suwon-si (KR); Heejeong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 95 days.

(21) Appl. No.: 14/438,801

(22) PCT Filed: Dec. 4, 2014

(86) PCT No.: PCT/KR2014/011847
§ 371 (c)(1),
(2) Date: Apr. 27, 2015

(87) PCT Pub. No.: WO2015/084080
PCT Pub. Date: Jun. 11, 2015

(65) Prior Publication Data
US 2016/0360556 A1 Dec. 8, 2016

(30) Foreign Application Priority Data

Dec. 4, 2013 (KR) .................. 10-2013-0150190
Feb. 21, 2014 (KR) .................. 10-2014-0020242

(51) Int. Cl.
*H04W 76/10* (2018.01)
*H04W 76/12* (2018.01)
(Continued)

(52) U.S. Cl.
CPC .......... *H04W 76/10* (2018.02); *H04L 65/103* (2013.01); *H04L 65/1016* (2013.01);
(Continued)

(58) Field of Classification Search
CPC ... H04W 76/02; H04W 76/022; H04W 40/02; H04W 8/12; H04W 8/02; H04W 80/10;
(Continued)

(56) References Cited

U.S. PATENT DOCUMENTS

2005/0141541 A1 6/2005 Cuny et al.
2007/0097958 A1 5/2007 Lappalainen
(Continued)

FOREIGN PATENT DOCUMENTS

WO 2013/015662 A2 1/2013

OTHER PUBLICATIONS

Vodafone et al., Introduce APN into the E-UTRAN initial attach procedure, 3GPP Draft, S2-075130 23401 APN in Attach, 3rd Generation Partnership Project(3GPP), Mobile Competence Centre, 650, Route Des Lucioles, F-06921 Sophia-Antipolis Cedex, France, Nov. 1, 2017, vol. SA WG2, XP050261850, Ljubljana, Slovenia.
(Continued)

*Primary Examiner* — Daniel Lai
(74) *Attorney, Agent, or Firm* — Jefferson IP Law, LLP

(57) ABSTRACT

A method and apparatus is provided that improves the quality of voice calls in a mobile communication network. The method of performing transmission/reception of signals in an evolved Node B (eNB) of a mobile communication system includes: receiving a first message including service request information from user equipment (UE); transmitting a second message including the service request information to an Mobility Management Entity (MME); receiving a third message including context information for the UE from the MME; and determining an inactivity timer value for the UE
(Continued)

based on the context information. The method and apparatus can maintain, when a voice call is created, connection with calling UE from when the called UE answers the call until the call is set up, thereby preventing part of a caller's voice data from being lost.

24 Claims, 11 Drawing Sheets

(51) Int. Cl.
*H04L 29/06* (2006.01)
*H04W 8/02* (2009.01)
*H04W 8/06* (2009.01)
*H04W 80/10* (2009.01)
*H04W 8/12* (2009.01)
*H04W 40/02* (2009.01)
*H04W 76/38* (2018.01)
*H04L 29/08* (2006.01)

(52) U.S. Cl.
CPC .......... *H04L 65/1069* (2013.01); *H04L 65/80* (2013.01); *H04L 69/28* (2013.01); *H04W 8/02* (2013.01); *H04W 8/06* (2013.01); *H04W 8/12* (2013.01); *H04W 40/02* (2013.01); *H04W 76/12* (2018.02); *H04W 80/10* (2013.01); *H04L 67/141* (2013.01); *H04W 76/38* (2018.02)

(58) Field of Classification Search
CPC .. H04W 8/06; H04W 76/068; H04L 65/1016; H04L 65/103; H04L 67/141
See application file for complete search history.

(56) References Cited

U.S. PATENT DOCUMENTS

| | | |
|---|---|---|
| 2008/0192671 A1* | 8/2008 | Torsner ............... H04L 1/1832 370/315 |
| 2008/0198871 A1 | 8/2008 | Shahidi et al. |
| 2009/0059811 A1 | 3/2009 | Wisely et al. |
| 2011/0093542 A1* | 4/2011 | Lau .................... H04L 65/1083 709/206 |
| 2012/0064884 A1 | 3/2012 | Ramachandran et al. |
| 2012/0182859 A1* | 7/2012 | Ikeda .................. H04L 1/1835 370/216 |
| 2013/0259000 A1 | 10/2013 | Nishida et al. |
| 2014/0378149 A1* | 12/2014 | Lau .................... H04W 76/045 455/450 |

OTHER PUBLICATIONS

NTT Docomo et al., Inactivity timer management function, 3GPP Draft, S2-120475, 3rd Generation Partnership Project (3GPP), Mobile Competence Centre, 650, Route Des Lucioles, F-06921 Sophia-Antipolis Cedex, France, Jan. 31, 2012, vol. SA WG2, XP050576350, Vancouver, Canada.

Ericsson, Release of Session based messaging session with intermediate node, 3GPP Draft, S2-042268-MSRP-Release, 3rd Generation Partnership Project (3GPP), Mobile Competence Centre, 650, Route Des Lucioles, F-06921 Sophia-Antipolis Cedex, France, May 24, 2004, vol. SA WG2, XP050249519.

Bruno Guedes et al., "Simple Media-Aware Packet Discard Algorithms", Information Networking, 2009, ICOIN 2009, International Conference on, IEEE, Piscataway, NJ, USA, Jan. 21, 2009, pp. 1-5, XP031451501, ISBN: 978-89-960761-3-1.

* cited by examiner

METHOD AND APPARATUS OF IMPROVING QUALITY OF CALLS IN MOBILE COMMUNICATION SYSTEM

TECHNICAL FIELD

The present invention relates to a method of improving the quality of voice calls in a mobile communication network that prevents part of voice data from being lost right after the call is established.

BACKGROUND ART

Mobile communication systems have been developed to provide voice call services, supporting users' mobility. With the development of communication technology, they have recently provided data communication services, or high speed data services. As mobile communication systems evolve to provide more various services, they face lack of resources and users' demands for high speed data services. Therefore, development of more advance mobile communication systems is required.

In order to conform to the requests, standardization of the $3^{rd}$ Generation Partnership Project Long Term Evolution (3GPP LTE) as the next generation mobile communication system is ongoing. LTE is a technology to implement high speed packet-based communication, up to maximum 100 Mbps. To this end, various proposals have been discussed. As an example, a scheme has been proposed to reduce the number of nodes on communication paths by simplifying network architecture. Another scheme has been proposed to apply wireless protocols to wireless channels.

FIG. 1 is a view of a general LTE mobile communication system.

Referring to FIG. 1, the wireless access network of the LTE mobile communication system includes an evolved Node B or an evolved UTRAN Node B (EUTRAN), hereafter called eNB 110, a Mobility Management Entity (MME) 120, a Serving Gateway (S-GW) 130, etc. User Equipment (UE) 100 is connected to an external network through then eNB 110, the S-GW 130, and a Packet Data Network Gateway or Packet Data Network (PDN) Gateway, hereafter called P-GW 160.

eNB 110 is a Radio Access Network (RAN) node and corresponds to a Radio Network Controller (RNC) of a Universal Terrestrial Radio Access Network (UTRAN) system and a Base Station Controller (BSC) of a GSM EDGE Radio Access Network (GERAN) system. eNB 110 is connected to UE 100 through a wireless channel and performs functions similar to those of a conventional RNC/BSC. eNB 110 may simultaneously cover a number of cells.

In LTE, since the user's traffic and real-time services, such as Voice over IP (VoIP) service, are routed through shared channels, systems are required for collecting status information about UE devices 100 and for scheduling the UE devices. These systems are covered by the eNB 110.

MME 120 performs control functions. One MME 120 may be connected to a number of eNBs.

S-GW 130 provides data bears. S-GW 130 creates or removes a bearer under the control of the MME 120.

Application Function (AF) 140 exchanges application-related information with a user in a level of application.

Policy Charging and Rules Function (PCRF) 150 controls policy related to a user's Quality of Service (QoS). Policy and Charging Control (PCC) rule corresponding to policy is transmitted to the P-GW 160. Policy Charging and Rules Function (PCRF) 150 is an entity of controlling a QoS for traffic and a charging service. In general, user plane (UP) refers to a path connecting UE 100 and an RAN node, i.e., eNB 110, S-GW 130, and P-GW 160, through which user's data is transmitted/received. The path between UE 100 and eNB 110 uses a wireless channel and is subjected to the limitation of resources.

In a wireless communication system such as LTE, the unit of channel to which QoS can be applied is an Evolved Packet System (EPS) bearer. One EPS bear is used to transmit IP flows with the same QoS request. An EPS bear may be designated with a parameter related to QoS, including QoS Class Identifier (QCI) and Allocation and Retention Priority (ARP). The QCI is a parameter defining the QoS priority as an integer. The ARP is a parameter to determine whether to accept or refuse the creation of a new EPS bear.

An EPS bear corresponds to a Packet Data Protocol (PDP) context of a General Packet Radio Service (GPRS) system. One EPS bear belongs to PDN. The PDN has an Access Point Name (APN) as an attribute. If PDN connection for an IMS service such as Voice over LTE (VoLTE) is formed, it must be created by using a well-known IMS APN.

In order to support voice calls, LTE networks employ an IMS-based VoLTE technology using a Packet Switched (PS) delivery or a circuit switched fall back (CSFB) technology using a circuit switched (CS) delivery for a 2G/3G system. In LTE networks, the term 'VoLTE' has the same concept as 'Voice over IMS (VoIMS).'

DISCLOSURE OF INVENTION

Technical Problem

The present invention has been made in view of the above problems, and provides a method that prevents, when a voice call is created and established between the calling party and the called party and voice data start to be exchanged, part of the voice data from being lost and thus the quality of call service (QoS) from being degraded.

The present invention further provides a method that prevents the loss of any part of the called party's voice data to be transmitted to the calling party in a state where: although, when the calling UE is disconnected with the called UE within a time interval from a time point that the calling UE has sent a voice call setup request to the called UE and the called UE has received the request to a time point that the called party answers the call, it cannot receive the called party's voice data from the called party's UE while the called party answers the call and starts to speaks to the calling party, and makes a re-connection with the calling UE.

Solution to Problem

In accordance with an exemplary embodiment of the present invention, the present invention provides a method of performing transmission/reception of signals in an evolved Node B (eNB) of a mobile communication system including: receiving a first message including service request information from user equipment (UE); transmitting a second message including the service request information to an Mobility Management Entity (MME); receiving a third message including context information for the UE from the MME; and determining an inactivity timer value for the UE based on the context information.

In accordance with another exemplary embodiment of the present invention, the present invention provides an evolved Node B (eNB) of performing transmission/reception of signals in a mobile communication system including: a transceiver for performing transmission/reception of signals; and a controller for: controlling the transceiver; receiving a first message including service request information from user equipment (UE); transmitting a second message including the service request information to an Mobility Management Entity (MME); receiving a third message including context information for the UE from the MME; and determining an inactivity timer value for the UE based on the context information.

In accordance with another exemplary embodiment of the present invention, the present invention provides user equipment (UE) of performing transmission/reception of signals in a mobile communication system including: a transceiver for performing transmission/reception of signals; and a controller for controlling the transceiver and transmitting a first message including service request information to an evolved Node B (eNB). The eNB determines an inactivity timer value for the UE based on context information that is determined according to the service request information.

In accordance with another exemplary embodiment of the present invention, the present invention provides a method of performing transmission/reception of signals in an evolved Node B (eNB) of a mobile communication system including: receiving a message for a sending call from calling user equipment (UE); transmitting the message for a sending call to called UE; receiving a packet corresponding to the sending call from the calling UE or a server related to IP Multimedia Subsystem (IMS); and maintaining connection with the calling UE based on the received packet.

In accordance with another exemplary embodiment of the present invention, the present invention provides an evolved Node B (eNB) of performing transmission/reception of signals in a mobile communication system including: a transceiver for performing transmission/reception of signals; and a controller for: controlling the transceiver; receiving a message for a sending call from calling user equipment (UE); transmitting the message for a sending call to called UE; receiving a packet for maintaining connection with the calling UE, in response to the sending call, from the calling UE or a server related to IP Multimedia Subsystem (IMS); and maintaining connection with the calling UE based on the received packet.

In accordance with another exemplary embodiment of the present invention, the present invention provides user equipment (UE) of performing transmission/reception of signals in a mobile communication system including: a transceiver for performing transmission/reception of signals; and a controller for: controlling the transceiver; transmitting a message for a sending call to called UE to an evolved Node B (eNB); and transmitting a packet for maintaining connection with the UE, in response to the sending call, to the eNB.

In accordance with another exemplary embodiment of the present invention, the present invention provides an IP Multimedia Subsystem (IMS) related server of performing transmission/reception of signals in a mobile communication system including: a transceiver for performing transmission/reception of signals; and a controller for: controlling the transceiver; receiving a message for a sending call from calling user equipment (UE); transmitting the message for a sending call to called UE; and transmitting a message for maintaining connection with the calling UE to the calling UE.

Advantageous Effects of Invention

As described above, the embodiments can hold, when a voice call is created, the connection between the calling UE and the called UE until the call has been set up as the called party answers, thereby preventing the loss of any part of the called' party's voice data.

BRIEF DESCRIPTION OF DRAWINGS

The features and advantages of the invention will become more apparent from the following detailed description in conjunction with the accompanying drawings, in which.

MODE FOR THE INVENTION

Figure 1:
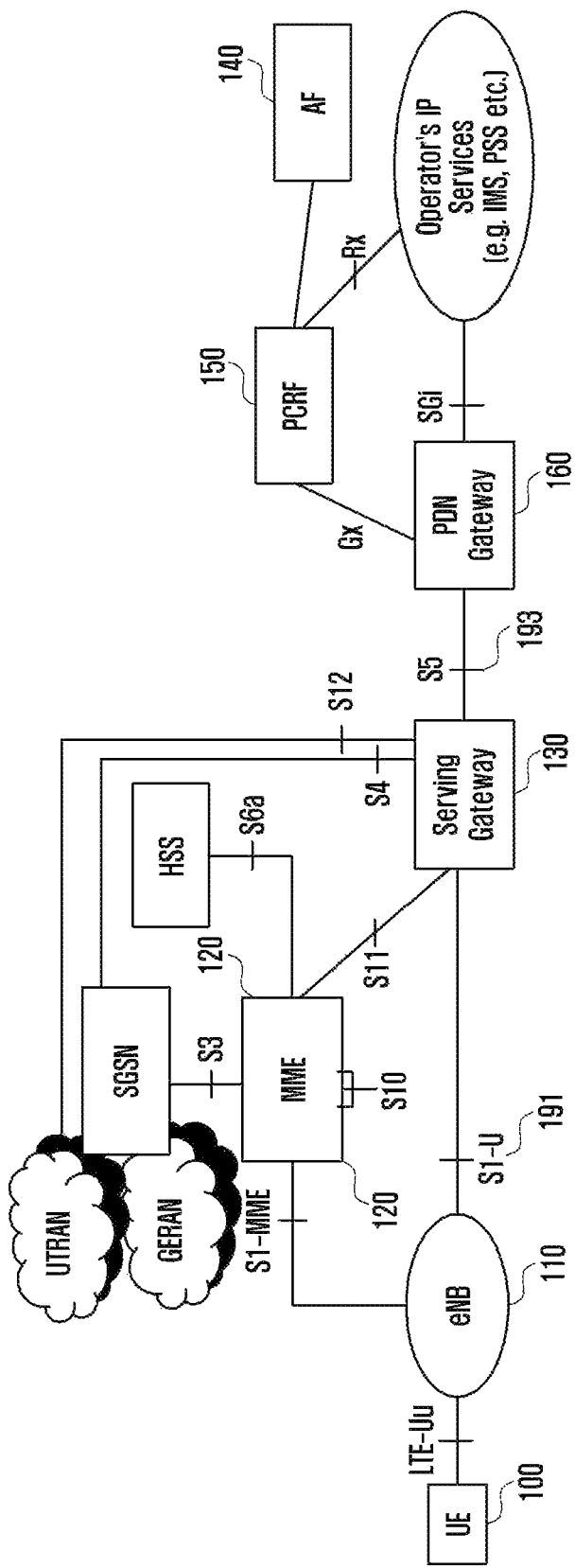
FIG. 1 is a view of a general LTE mobile communication system.

Hereinafter, embodiments of the present invention are described in detail with reference to the accompanying drawings.

Detailed descriptions of well-known functions and structures incorporated herein may be omitted to avoid obscuring the subject matter of the invention.

Part of the elements in the drawings is exaggerated in shape, omitted or schematically shown to focus on the invention. In the drawings, the same or similar elements are denoted by the same reference numbers.

The features and advantages of the invention and the methods to accomplish the objectives of the invention will become more apparent from the following detailed description and the accompanying drawings. Although embodiments of the invention have been described in detail, it should be understood that many variations and modifications of the basic inventive concept herein described, which may be apparent to those skilled in the art, will still fall within the spirit and scope of the exemplary embodiments of the invention as defined in the appended claims.

In addition, it should be understood that the blocks in the signal flowcharts and the combinations in the flowcharts can be performed via computer programming instructions. These computer programming instructions can be installed to processors of data processing equipment that can be programmed, special computers, or universal computers. The instructions, performed via the processors of data processing equipment or the computers, can create means that perform functions described in blocks of the flow charts. In order to implement functions in a particular mode, the computer programming instructions can be stored in a computer available memory or computer readable memory that can support computers or data processing equipment that can be programmed. Therefore, the instructions, stored in the computer available memory or computer readable memory, can be installed to the products, and perform the functions described in the block(s) of the flow charts. In addition, since the computer programming instructions can also be installed to computers or data processing equipment that can be programmed, they can create computer-executable processes as a series of operations are performed therein, described in the block(s) of the flow charts therein.

The blocks of the flow charts refer to part of codes, segments or modules that include one or more executable instructions to perform one or more logic functions. It should be noted that the functions described in the blocks of the flow charts may be performed in a different order from the embodiments. For example, the functions described in two adjacent blocks may be performed at the same time or in reverse order.

In the embodiments, the terminology, component '~unit,' refers to a software element or a hardware element such as a PGGA, an ASIC, etc., and performs a corresponding function. It should be, however, understood that the component '~unit' is not limited to a software or hardware element. The component '~unit' may be implemented in storage media that can be designated by addresses. The component '~unit' may also be configured to regenerate one or more processors. For example, the component '~unit' may include various types of elements (e.g., software elements, object-oriented software elements, class elements, task elements, etc.), segments (e.g., processes, functions, achieves, attribute, procedures, sub-routines, program codes, etc.), drivers, firmware, micro-codes, circuit, data, data base, data structures, tables, arrays, variables, etc. Functions provided by elements and the components '~units' may be formed by combining the small number of elements and components '~units' or may be divided into additional elements and components '~units.' In addition, elements and components '~units' may also be implemented to regenerate one or more CPUs in devices or security multi-cards.

Hereinafter, exemplary embodiments of the present invention are described in detail with reference to the accompanying drawings. The same reference numbers are used throughout the drawings to refer to the same or similar parts. Detailed descriptions of well-known functions and structures incorporated herein may be omitted to avoid obscuring the subject matter of the invention.

Although embodiments of the present disclosure will be described based on OFDM-based wireless communication systems, or the 3GPP EUTRA standard, and a VoLTE service, it will be appreciated to those skilled in the art that the subject matter of the present invention can be applied to other communication systems and services with a similar technical background and channel format without departing from the scope of the present invention. It should be understood that the VoLTE-based technology described in the present disclosure may be applied to other IMS-based voice services (e.g., Voice over WiFi). It should be understood that the messages and packets are interchangeably used in the present disclosure.

It should be understood that each of the communication entities in the present disclosure includes a transceiver for transmitting/receiving signals to/from the other communication entities and a controller for controlling the transceiver and the operations of the communication entities based on data transmitted/received through the transceiver.

Although embodiments of the present invention will be described based on states where, after transmitting an invite message, a calling user equipment (UE) receives 100 trying message or 180 ringing message or does not explicitly receive the messages, or a combination of the states, since transmitting/receiving the 100 trying message or 180 ringing message is optional, the subject matter of the present invention may be identically applied to the other modifications, etc., regardless of transmission/reception of the 100 trying message or 180 ringing message. In the following embodiments, 100 trying message, 180 ringing message, 603 decline message, and 200 OK message are used for a case where a Session Initiation Protocol (SIP) message includes a response code representing 100 trying message, 180 ringing message, 603 decline message or 200 OK message.

Although embodiments of the present disclosure will be described based on a case where the eNB and user equipment (UE) are disconnected when a transmission/reception packet for the UE is not created in the eNB until an inactivity time period of an inactivity timer has expired from the initial value set by the eNB, it should be understood that the subject matter of the present invention may also be applied to a case where the eNB and user equipment (UE) are disconnected when a transmission/reception packet for the UE is not created in the eNB within the inactivity time period.

Figure 2:
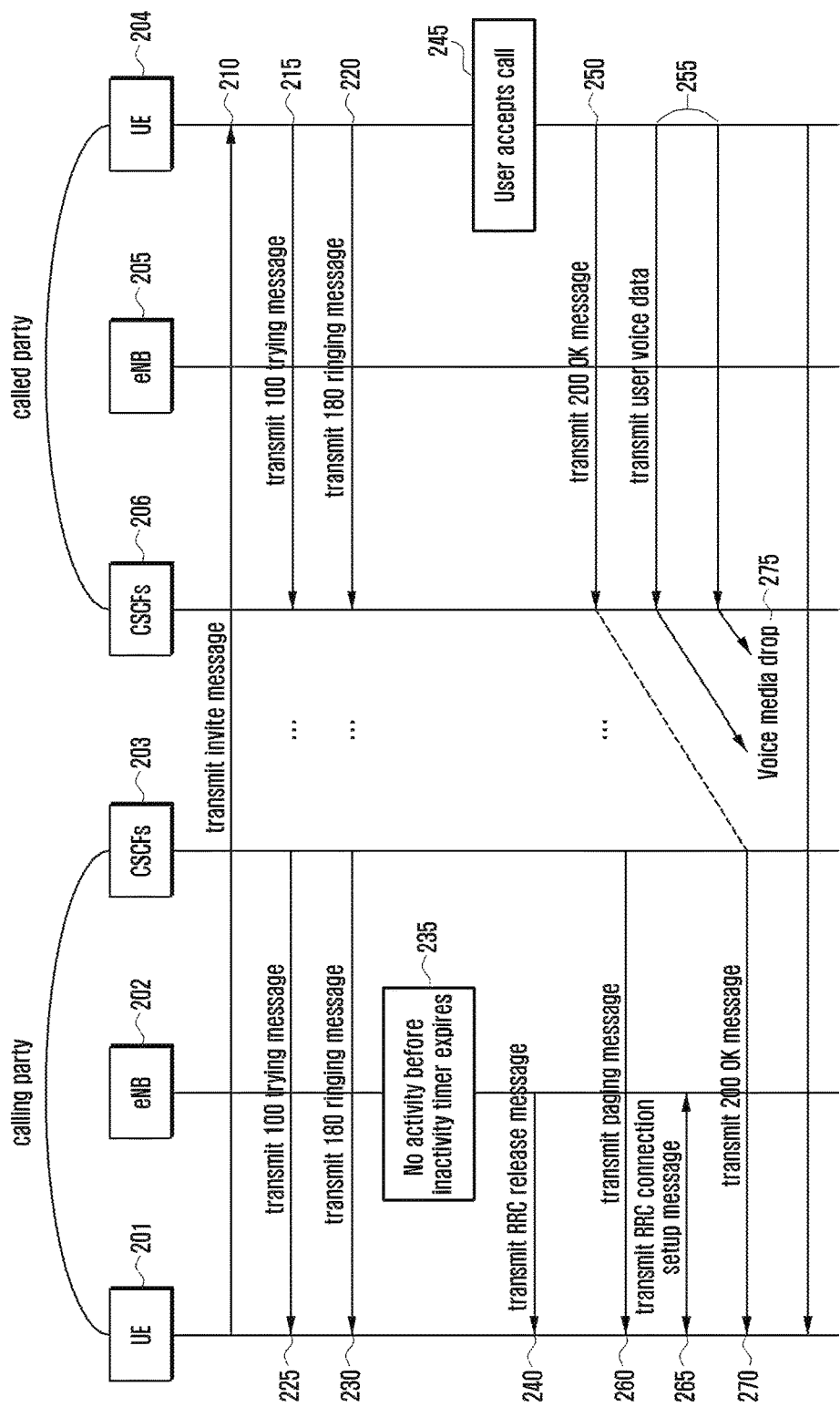
FIG. 2 is a signal flow chart that describes a state where incoming call and outgoing call are made according to an embodiment of the present invention.

First, a case where a problem occurs in an LTE mobile communication system is described. FIG. 2 is a signal flow chart that describes a state where incoming call and outgoing calls are made according to an embodiment of the present invention.

Referring to FIG. 2, the communication system performs transmission/reception of signals among calling UE 201, calling party eNB 202, calling party CSCFs 203, called UE 204, called party eNB 205 and called party CSCFs 206. The embodiment includes a case where part of user's voice data is not transmitted in the communication system, or a call is dropped.

The calling UE 201 transmits an invite message for making a call to the called UE 204 (210).

After receiving the invite message, the called UE 204 transmits a 100 trying message to the calling UE 201 (215), and also transmits a 180 ringing message informing that the phone is ringing to the calling UE 201 (220).

The calling UE 201 receives the 100 trying message and the 180 ringing message including the called UE's states (225 and 230).

When the called UE 204 answers, or does not decline, the call immediately after the phone starts ringing, the calling UE 201 may have a relatively long period of time without transmitting/receiving any packet to/from the network.

When the eNB 202 detects that the state continues (i.e., where the transmitting/receiving of data or signals is not performed) for a preset period of time set to a timer (235), it releases connection (or RRC) from the calling UE 201 (240).

At this state, when the called user of the called UE 204 accepts the call (245), the called UE 204 transmits a 200 OK message for informing that the called user's call acceptance to the calling UE 201 (250), and the called user simultaneously starts to speak to the calling user since he/she has already accepted to the call (255). At this state, since the calling UE 201 has released the RRC, the network (CSCFs) 203 performs a paging process to establish connection with the calling UE 201 (260) and the calling UE 201 thus performs a service request procedure (265). The service request procedure includes an RRC connection setup.

Since paging transmission/reception and connection establishment take a period of time, the voice data corresponding to a speech that the called users has made to the calling user during the period of time may be lost, i.e., voice media drop (275).

In order to resolve the problem, the present invention is implemented, showing a variety of embodiments. That is, they provide systems to hold the connection between the calling UE and called UE from when the calling UE transmits an invite message to make a call to the called UE until it receives a 200 OK message from the called UE (270).

When the eNB detects that any packet (signaling and data) to be transmitted/received to/from UE has not been created for over a period of time, it releases connection (RRC and/or S1 connection) from the UE. For this process, a timer is used and it is generally called to an inactivity timer.

In order to prevent the release of connection between the calling UE and the called UE: the inactivity timer needs to set the initial value to a relatively large value to keep the connection from when the calling UE transmits an invite message to the called UE until the calling UE receives the 200 OK message from the called UE; or signals or packets for UE need to be created and transmitted to eNB.

Figure 3:
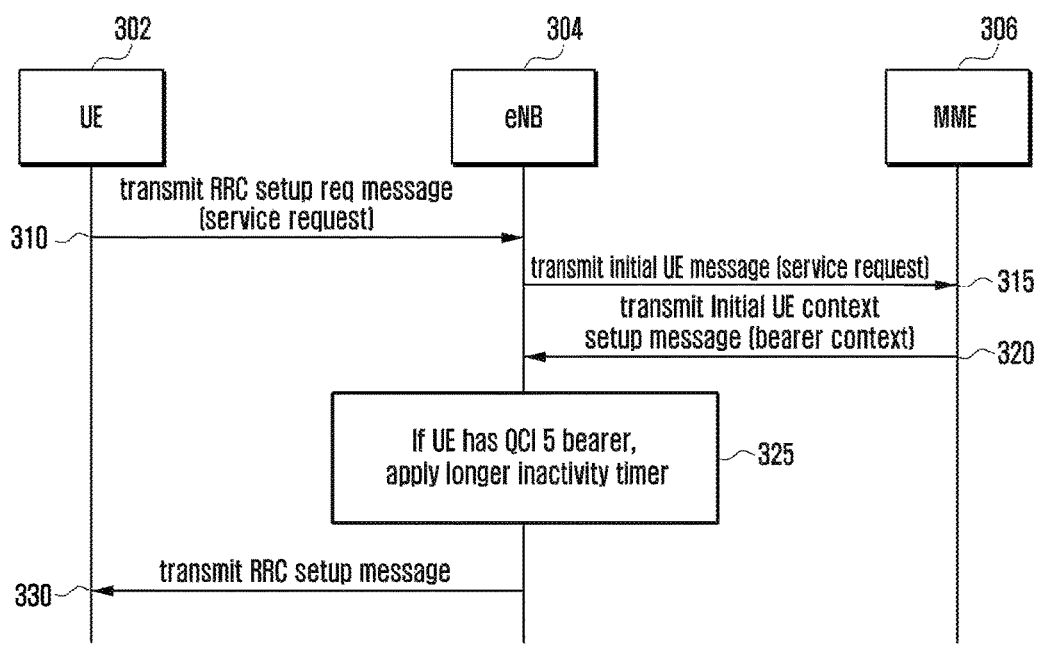
FIG. 3 is a signal flow chart that describes a method where an inactivity timer is set to have a relatively large period of time when an eNB uses an IMS-based voice service according to an embodiment of the present disclosure.

FIG. 3 is a signal flow chart that describes a method where an inactivity timer is set to have a relatively large period of time when an eNB uses an IMS-based voice service according to an embodiment of the present disclosure.

Referring to FIG. 3, UE 302, eNB 304 and MME 306 are communicating with each other.

UE 302 transmits an RRC setup request message including a service request to eNB 304 in order to establish connection with eNB 304 (310). The service request is transmitted to MME 306.

After receiving the RRC setup request message, eNB 304 transmits the service request to the MME 306 (315).

MME 306 transmits an Initial UE context setup message including context for UE 302 to the eNB 304, in response to the received message (320). For example, the context for UE 302 may include information about a bearer that the UE 302 is using.

The eNB 325 adjusts the inactivity timer value based on the bearer context transmitted from the MME 306 (325). For example, when the eNB 325 detects that UE 302 is in a state where it performs an IMS signaling with the network, it may apply a larger value of inactivity timer to the current state than the previous state. When the bearer context of UE 302 includes a bearer of QCI 5, eNB detects that UE 302 uses VoIMS. Since the problem described above may occur because of the latent release of the connection, the inactivity timer may set the initial value to a value (e.g., 30 or 60 seconds) larger than the default value (e.g., 10 seconds). That is, the eNB 304 sets a larger inactivity timer to UE with a QCI 5 bearer than other UE, thereby keeping the connection for the UE, without disconnection, although any transmission/reception packet is not created for a relatively long period of time.

The method of applying a relatively large inactivity timer to UE using VoIMS is implemented as follows.

As a first example, in a state where a configuration for a number of inactivity timer initial values has been preset, one of the values is selected as a default configuration and applied to UE. When the UE satisfies the condition (i.e., a condition of using VoIMS), a configuration with a value larger than the initial value of the timer set according to the default configuration is selected and applied to the UE. For example, in a state where a default configuration has been set in such a way that the initial value of the inactivity timer is 10 seconds and an additional configuration is set in such a way that the initial value of the inactivity timer is 30 seconds, when UE satisfies the same condition as eNB uses VoIMS, the additional configuration is selected and applied to the UE. In other embodiments, the configuration value may be determined according to a preset value (preset values) or based on the signaling with respect to the network.

As a second example, in a state where a default configuration is applied to UE, when the UE satisfies the condition (i.e., a condition of using VoIMS), an additional value is added to the initial value of the inactivity timer included in the default configuration and the result is applied to the inactivity timer. For example, in a state where the initial value is 10 seconds and an additional value is 20 seconds, when UE satisfies the conditions, eNB adds the additional value 20 second to the initial value 10 and uses 30 seconds as the initial value of the inactivity timer. In other embodiments, the initial value and/or the additional value may be determined according to a preset value (preset values) or based on the signaling with respect to the network.

As a third example, in a state where an inactivity timer as a default configuration is applied to UE once, when the UE satisfies the condition (i.e., a condition of using VoIMS), the inactivity timer is applied to the UE twice or more times. For example, in a state eNB has been set with a default configuration where the initial value of the inactivity timer is 10 seconds and the application frequency is one, when UE using VoIMS satisfies the conditions, the inactivity timer is applied to the UE three times. This is a similar effect as the inactivity timer for UE using VoIMS increases to 30 seconds. In other embodiments, the application frequency of timers may be determined according to a preset value (preset values) or based on the signals transmitted to/from the network.

Figure 4:
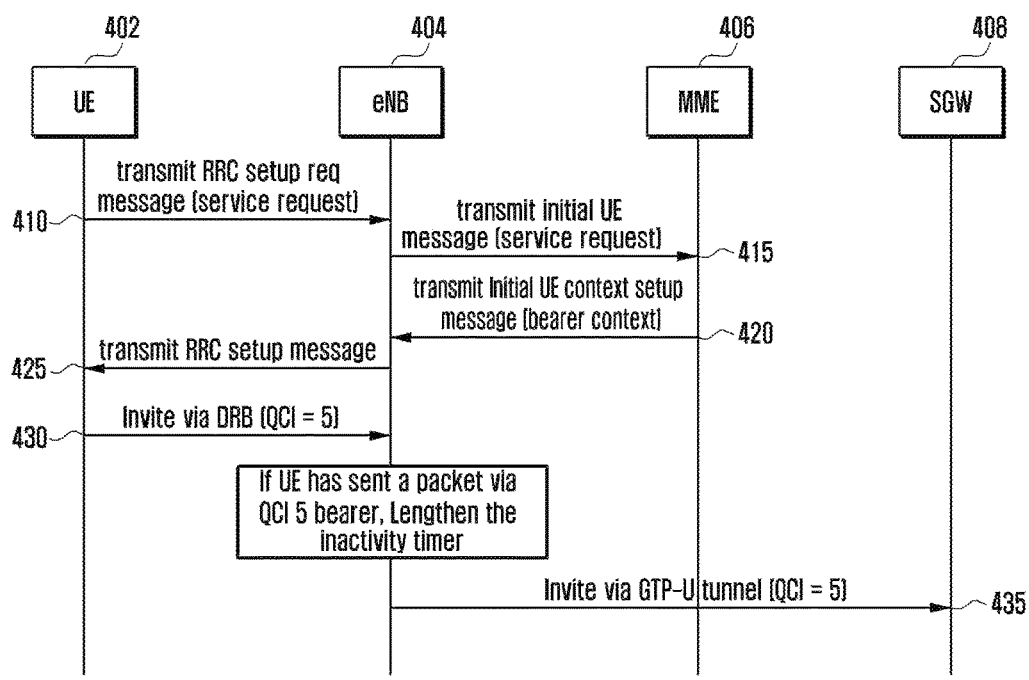
FIG. 4 is a signal flow chart that describes operation in a communication system according to an embodiment of the present disclosure.

FIG. 4 is a signal flow chart that describes operation in a communication system according to an embodiment of the present disclosure. When eNB requests an IMS-based voice service, the inactivity timer may be set to a relatively large period of time for a specific state.

Referring to FIG. 4, UE 402, eNB 404, MME 406 and SGW 406 are communicating with each other.

UE 402 transmits an RRC setup request message to eNB 404 in order to establish connection with eNB 404 (410). The RRC setup request message includes a service request message. The service request is transmitted to MME 406.

After receiving the RRC setup request message, eNB 404 transmits an Initial UE message including the service request to the MME 406 (415).

MME 406 transmits an Initial UE context setup message including context for UE 402, i.e., context of bearers that the UE 402 is using, to the eNB 404, in response to the received message (420).

The eNB 404 ascertains that the UE 402 is in a state where it may perform an IMS signaling with the network, based on the bearer context transmitted from the MME 406. When the bearer context of UE 402 includes a bearer of QCI 5, the eNB detects that UE 402 uses VoIMS.

The eNB 404 transmits an RRC setup message for establishing RRC to the UE 402 (425).

After establishing RRC with UE 402, when the eNB ascertain that UE 402 is in a state where it may perform an IMS signaling with the network (430), e.g., when packers are transmitted through a bearer of QCI 5 (a logical channel with respect to the eNB), the eNB 404 detects that the UE 402 is performing transmission of packets related to a real VoIMS service.

During the process, when the eNB 404 releases the connection with the UE 402 earlier, the problem described above may occur. To prevent the occurrence of the problem, the eNB 404 sets the initial value of the inactivity timer to a value (e.g., 30 or 60 seconds) larger than the default value (e.g., 10 seconds) in operation 430. That is, the eNB 404 keeps the connection with UE performing an IMS signaling, i.e., UE 402 that transmits packets through a bearer of QCI 5, for a larger period of time than with the other UE, although any transmission/reception packet is not created. Unlike the embodiment shown in FIG. 3, the embodiment of FIG. 4 is designed in such a way that the eNB 404 sets the initial value of the inactivity timer to a relatively large value only for the UE 402 that transmits VoIMS related packets through a bearer of QCI 5, thereby preventing the resources of the eNB 404 from being wasted and reducing the battery power consumption of the UE 402.

The method of applying a relatively large inactivity timer to UE using VoIMS is implemented as follows.

As a first example, in a state where a configuration for a number of inactivity timer initial values has been preset, one of the values is selected as a default configuration and applied to UE. When the UE satisfies the condition (i.e., a condition of using VoIMS), a configuration with a value larger than the initial value of the timer set according to the default configuration is selected and applied to the UE. For example, in a state where a default configuration has been set in such a way that the initial value of the inactivity timer is 10 seconds and an additional configuration is set in such a way that the initial value of the inactivity timer is 30 seconds, when UE satisfies the same condition as eNB uses VoIMS, the additional configuration is selected and applied to the UE. In other embodiments, the configuration value may be determined according to a preset value (preset values) or based on the signaling with respect to the network.

As a second example, in a state where a default configuration is applied to UE, when the UE satisfies the condition (i.e., a condition of using VoIMS), an additional value is added to the initial value of the inactivity timer included in the default configuration and the result is applied to the inactivity timer. For example, in a state where the initial value is 10 seconds and an additional value is 20 seconds, when UE satisfies the conditions, eNB adds the additional value 20 second to the initial value 10 and uses 30 seconds as the initial value of the inactivity timer. In other embodiments, the initial value and/or the additional value may be determined according to a preset value (preset values) or based on the signaling with respect to the network.

As a third example, in a state where an inactivity timer as a default configuration is applied to UE once, when the UE satisfies the condition (i.e., a condition of using VoIMS), the inactivity timer is applied to the UE twice or more times. For example, in a state eNB has been set with a default configuration where the initial value of the inactivity timer is 10 seconds and the application frequency is one, when UE using VoIMS satisfies the conditions, the inactivity timer is applied to the UE three times. This is a similar effect as the inactivity timer for UE using VoIMS increases to 30 seconds. In other embodiments, the application frequency of timers may be determined according to a preset value (preset values) or based on the signals transmitted to/from the network.

The eNB 404 transmits the received packet to the SGW 408 (435).

The two embodiments described above are implemented in such a way that: when UE uses a bearer of QCI 5 or transmits real packets through a bearer of QCI 5, eNB sets the initial value of the inactivity timer to a relatively large value. In another embodiment, MME determines the initial value of the inactivity timer and transmits it to eNB. MME determines whether UE performs an IMS signaling with the network. That is, MME determines whether UE uses a VoIMS service, based on QCI or APN of a PDN for the UE. For example, MME determines whether UE receives a VoIMS service, based on one or more of the following cases or the combination thereof: a case where UE has a PDN connection with IMS as APN, a case where UE has an EPS bearer of QCI 5 and a case where UE subscription information is set in such a way that UE uses VoIMS. When MME ascertains that UE has been using VoIMS, it requests eNB to apply a larger initial value of the inactivity timer to the UE than to UE that doesn't use VoIMS. To this end, MME may an Initial Context Setup Request message including initial inactivity timer IE to eNB. The initial inactivity timer IE includes an initial value of the inactivity timer that eNB will use. When eNB receives an Initial Context Setup Request message without an initial inactivity timer IE, it may apply a default value to the initial value of the inactivity timer. The embodiment may be implemented in such a way that the Initial Context Setup Request message includes an initial inactivity timer IE greater than a default value for UE that uses VoIMS and does not an initial inactivity timer IE for UE that does not use VoIMS.

Although the embodiments are implemented in such a way that a determination is made as to whether UE uses VoIMS based on bearer context (QCI, APN, etc.), they may be modified in such a way that the determination as to whether UE uses VoIMS is made based on packet inspection.

For example, when a network node receives a packet from UE over a service provider network, it applies Deep Packet Inspection (DPI) to the received packet and determines whether the received packet includes an INVITE message for starting call configuration. To do this, the network node detects whether the content of the packet from the UE starts with information representing an SIP INVITE message, e.g., "INVITE sip:" in the leading part of the packet. The detection function may be implemented in the eNB or any one node except for the eNB. When the node with the detection function is separated from the eNB, the detection result, i.e., the determination as to whether the received packet is a call configuration message, INVITE, is transmitted to the eNB.

In order to control load for the detection process, the detection for the call configuration request message is applied to not all of the packets but to only VoIMS related packets, e.g., a packet transmitted through a bearer with QCI 5 or a packet transmitted through a PDN connection with an APN of IMS.

Figure 5:
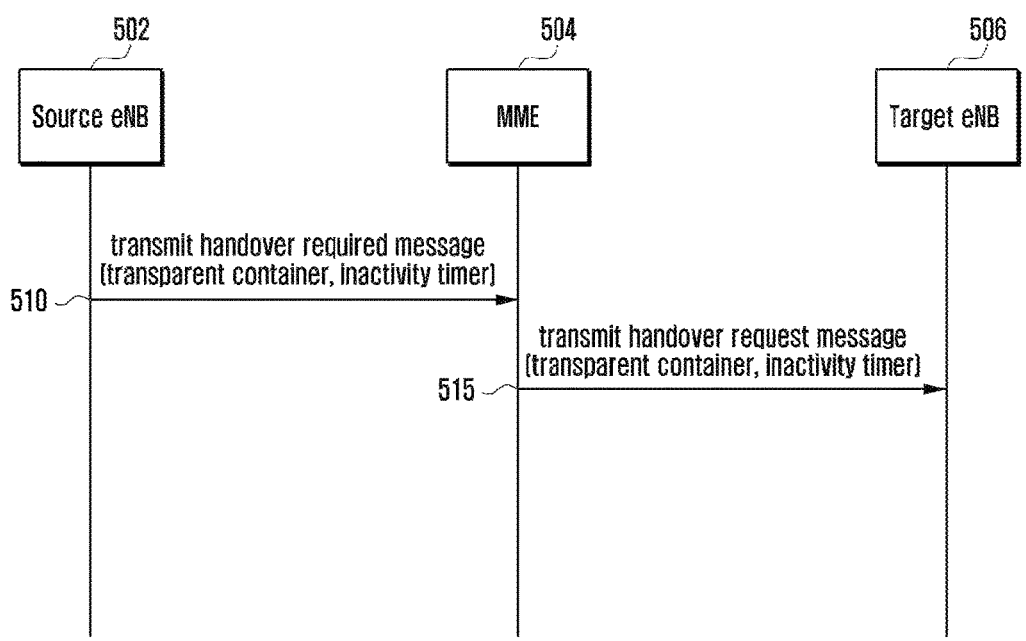
FIG. 5 is a signal flow chart that describes a method of transmitting timer information during the handover according to an embodiment of the present disclosure.

FIG. 5 is a signal flow chart that describes a method of transmitting timer information during the handover according to an embodiment of the present disclosure. More specifically, FIG. 5 shows a diagram illustrating a method of transmitting, when S1 handover occurs, the information from a first eNB through MME to a second eNB.

Referring to FIG. 5, transmission/reception of signals may be performed among a source eNB 502, MME 504, and a target eNB 506.

When UE that transmits/receives signals to/from the source eNB 502 undergoes a handover from a source network to a target network in the middle of setting a VoIMS call, the information indicating that a relatively larger inactivity timer needs to be used, described in the foregoing embodiments, is required to be transmitted a second network (the target network).

When a handover is needed for UE, the source network may transmit information to the MME 504, including an identifier, indicating that a relatively larger inactivity timer needs to be applied to the UE, and/or the initial value of the inactivity timer (510).

MME 504 transmits a handover request message including the information received in operation 510 to the second network including the target eNB 506 (515). After receiving the handover request message, the second network applies a relatively larger inactivity timer based on the identifier or applies the initial value of the inactivity timer transmitted from the first network. When the type of handover is an X2 handover, the identifier or the initial value of the inactivity timer may be included in an X2 Handover Request message and then transmitted. When the type of handover is an S1 handover, the identifier or the initial value of the inactivity timer may be included in an S1 Handover Request message and then transmitted to MME. After that, the S1 Handover Request message may be transmitted to the second network through the MME. When S1 handover is used, the identifier or the initial value of the timer is included in a field of a transparent container inserted to the S1 message and then transmitted.

The embodiments of the present disclosure described above were related to methods that keep the connection for UE using a voice service as long as possible. The following embodiments of the present disclosure include methods of continuously transmitting/receiving packets so that eNB may keep the connection.

According on embodiment of the present disclosure, after UE makes a VoIMS outgoing request (transmits an Invite message), the UE transmits NAS messages to the MME until the UE receives the final response (a 200 OK message) so that the connection can be kept.

Since the NAS message that UE transmits to the MME is transmitted through eNB, when the transmission is detected, the eNB disconnects the UE. At the moment, the NAS message transmitted by UE may include an EPS Mobility Management (EMM) status message, and cause of the EMM status message may include an EMM cause that allows the MME that has received an EMM status message from the UE to ignore an EMM status message that is received without any other operation or without altering the status for the UE.

For example, EMM cause of an EMM status message may be "dummy" indicating a meaningless EMM status message, "connection alive" indicating the connection retention, "ignore required" indicating reception and ignorance by MME, etc. As such, MME receives the indicated NAS messages and ignores the corresponding EMM status messages.

Figure 6:
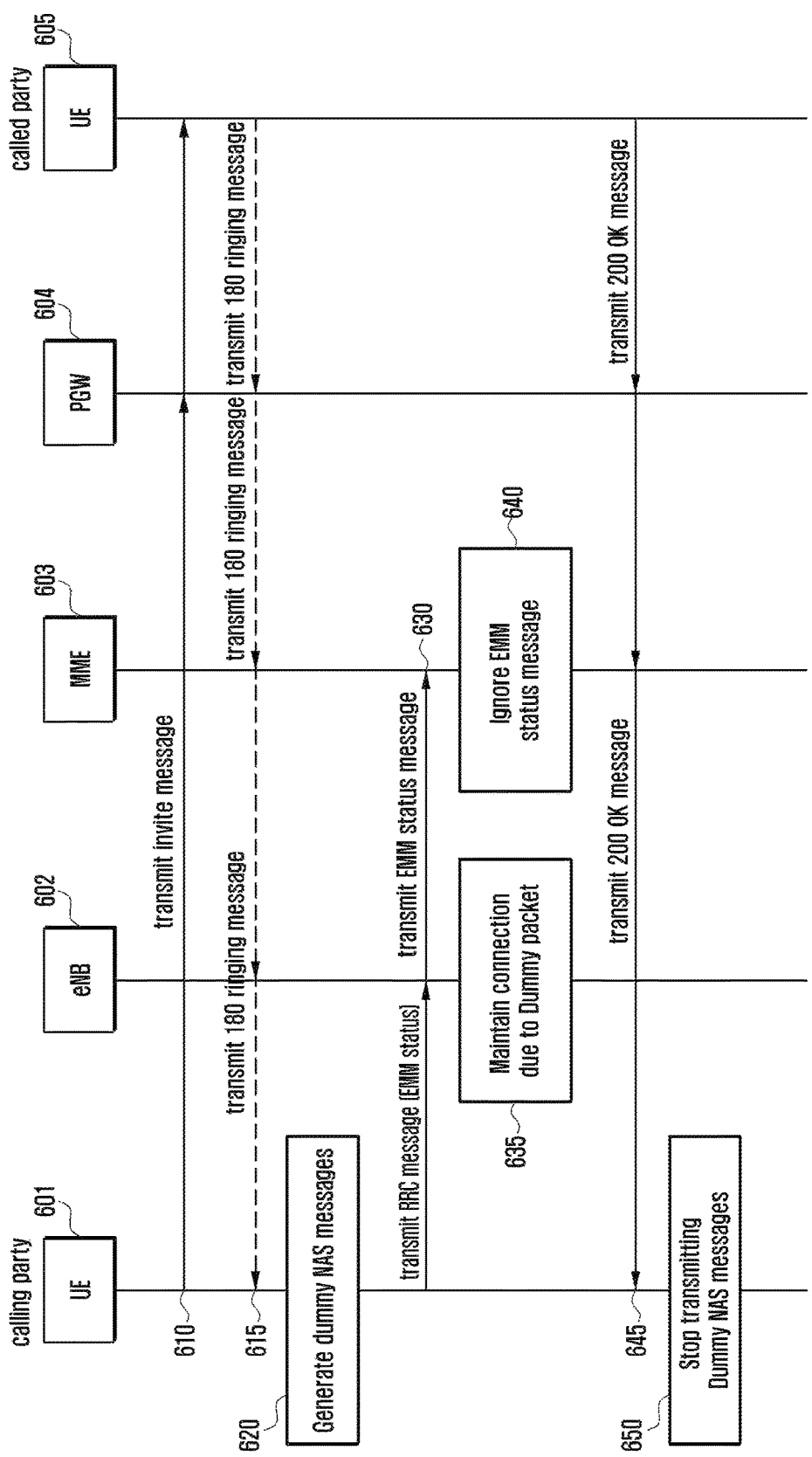
FIG. 6 is a signal flow chart that describes a method of transmitting NAS messages, without interruption, by UE, to keep the connection, after a VoIMS call setup request is made, according to an embodiment of the present disclosure.

FIG. 6 is a signal flow chart that describes a method of transmitting NAS messages, without interruption, by UE, to keep the connection, after a VoIMS call setup request is made, according to an embodiment of the present disclosure.

Referring to FIG. 6, signals may be transmitted/received between entities of the communication system including calling UE 601, eNB 602, MME 603, PGW 604 and called UE 605. Communication entities that are not directly related to the embodiment will be omitted in the description.

The calling UE 601 transmits an invite message for configuring a voice call to the called UE 605 (610).

When the called UE 605 transmits a 100 trying message or a 180 ringing message, the calling UE 601 may receive the messages (615).

The calling UE 601 may repeatedly create and transmit a message to the eNB 602 to keep the connection state until the called UE 605 accepts a call in at least one interval of the following: after the calling UE 601 transmits the invite message and after the calling UE 601 receives the 180 ringing message, and at least one of the following cases is satisfied, which are: before the call has been configured and before the called UE 605 declines the call (620 and 630). At this moment, in the embodiment, the message may include an NAS message. Since the NAS message is transmitted, in a form of RRC message, more specifically, a form of message included in an ULInformationTransfer message, to the MME 603 through the eNB 602, the eNB 602 detects that packet transmission/reception for UE 601 has occurred and may not perform the connection releasing (635).

As described above, the NAS message created and transmitted by UE 601 may be an EMM status message including a cause indicating that EMM 603 has received the message and then may not need to perform an additional operation or to alter the status. The NAS message may be an Uplink NAS transport or Uplink Generic NAS transport including a cause indicating that UE 601 similarly transmits a dummy message or MME 603 receives a message and may ignore the message. In that case, the message container included in the message may not include any information. MME 603 may ignore the received message (640). According to embodiments, UE 601 may transmit the NAS message, every a period of time, until at least one of the following cases is satisfied, which are: before a call has been set up and a voice call starts and a case where the called UE 605 declines the call setup. The period of time may be less than the initial value of the general inactivity timer of eNBs (e.g., 8 seconds).

The UE 601 may use at least one of the following: an event to receive a 200 OK message transmitted from the called UE 605 and an event to decline a call setup request transmitted from the called UE 605, e.g., an event to receive a 603 decline message, as a standard for determining a point of time when transmission of the NAS is stopped (645 and 650).

In another embodiment of the present disclosure, in order to keep the connection with UE, PGW may continue creating messages and transmitting the messages to the UE. More specifically, in a state where UE is using VoIMS, when PGW installs a packet filter in the UE so that the UE can discard packets transmitted from a specific address (or a combination of ports) and the calling UE requests a VoIMS setup, the PGW periodically creates a packet transmitted from an address that may match with the installed filter and transmits the created packet to the UE. In the embodiments, the packet may be a dummy packet. In description of the embodiments of the present invention, the payload of the dummy packet does not include any information or includes information that does not require a specific operation in the called party or transmission node or does not cause the state alteration.

The packet transmission may cause the eNB not to perform the connection release and UE may directly discard packets received by the installed packet filter.

Figure 7:
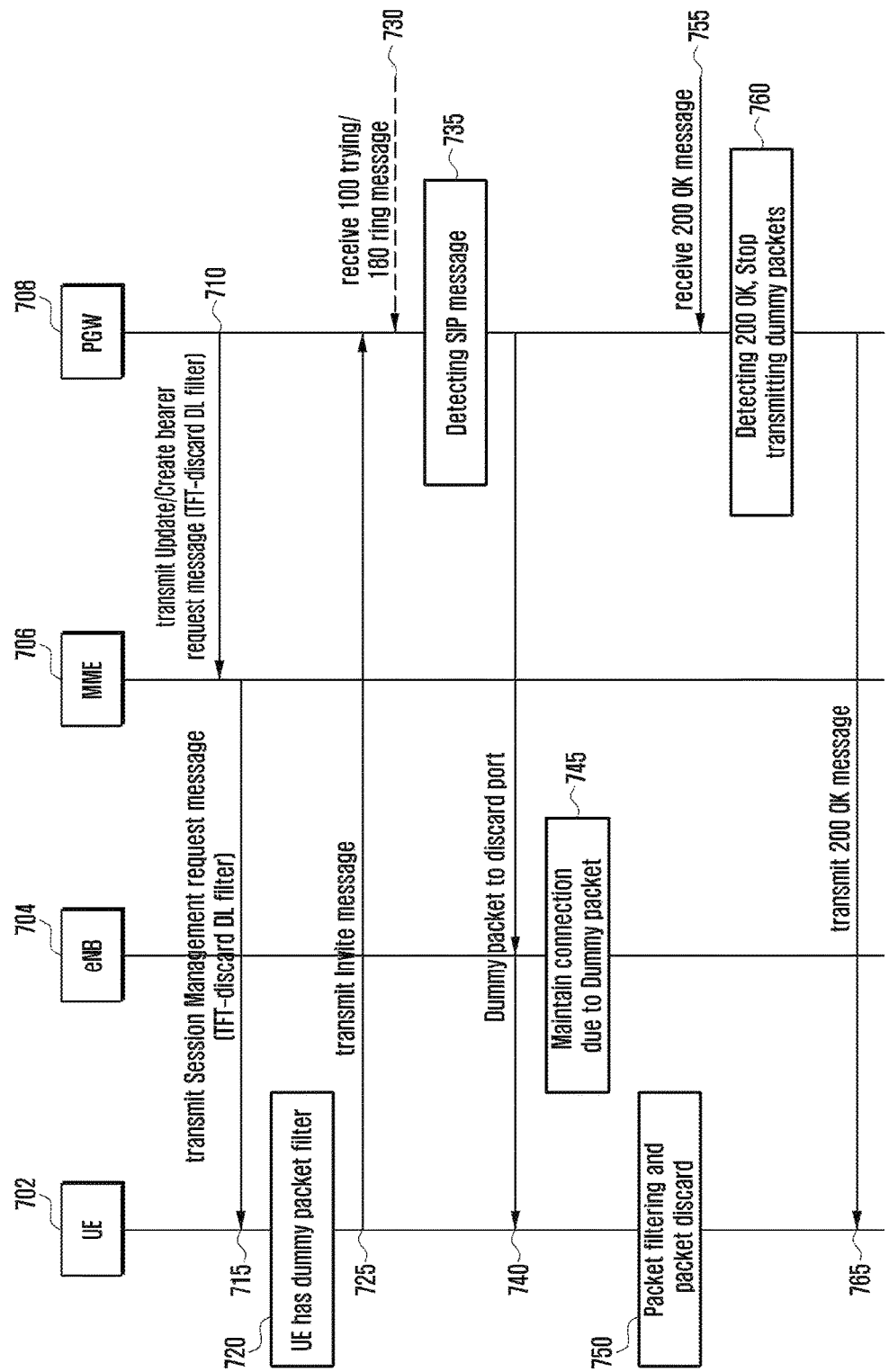
FIG. 7 is a signal flow chart that describes a method of transmitting messages, without interruption, by PGW, to keep the connection, when a VoIMS call setup request is created, according to an embodiment of the present disclosure.

FIG. 7 is a signal flow chart that describes a method of transmitting messages, without interruption, by PGW, to keep the connection, when a VoIMS call setup request is created, according to an embodiment of the present disclosure.

Referring to FIG. 7, signals may be transmitted/received between UE 702, eNB 704, MME 706, and PGW 708.

When a PDN connection or EPS bearer is formed for UE 702 (710), the PGW 708 creates a packet filter with a specific address (or a combination of ports) and may transmit the packet filter to the UE 702 through the MME 706 (715). The packet filter may include, when the UE 702 receives a matching packet, information about the content where a discarding operation needs to be performed. In the embodiment, the packet filter performing the function may be called a discard packet filter.

The UE 702 configures the received packet filter and may perform a function corresponding to the packet filter (720).

As an example, PGW 708 sets: the address of the packet filter to a preset address (e.g., 0.0.0.0.); the direction to downlink; and the report port to 9 (discard port), and may set UE 702 so that packets received through the address are all discarded. The packet filter may be included, as a TFT, in a message, Create Session response/Create Bearer Request, transmitted to the SGW. The SWG receives the packet filter and transmits the received packet filter to the MME 706.

MME 706 includes the received packet filter (TFT) information in Active default/dedicated EPS bearer context request transmitted to UE.

In the embodiment, the creation and transmission of the packet filter by the PGW 708 may be performed, only when the UE 702 creates EPS bearer of PDN connection related to VoIMS, or according to information SDF template of a PCC rule transmitted from PCRF.

In addition, the creation and transmission of the packet filter to the UE 702 may be performed at a point of time when a bearer is formed and when the bearer context is altered. In that case, an update/modify bearer request message instead of Create Session response/Create Bearer Request and a modify EPS bearer context request message instead of Active default/dedicated EPS bearer context request may be used.

When a VoIMS call is created, the UE 702 transmits an invite message to the PGW 708 (725). When the PGW 708 receives the invite message and recognizes that a call setup starts, it periodically creates and transmits messages in order to keep the connection with the calling UE 702.

The recognition (735) of a call setup by the PGW 708 may include at least one of the following cases: where the PGW 708 analyzes a packet transmitted from the calling UE 702 and ascertains that the analyzed packet is an invite message; and where the PGW 708 analyzes a packet transmitted from the called party and ascertains that the analyzed packet is a 180 ringing message or 100 trying message (730).

The PGW 708 may periodically transmit a dummy packet after a call has been set up and until the call starts or before the call is declined (740). In the embodiment, the period for transmitting the dummy packet may be less than the initial value of the general inactivity timer of eNBs 704 (e.g., 8 seconds). The PGW 708 may non-periodically transmit a dummy packet to the UE 702 at an arbitrary time.

The eNB 704 transmitting the dummy packet as describe above may keep the connection with the UE 702 in order to perform transmission of the dummy packet (745).

The UE 702 may discard the received dummy packet, based on the packet filter that has been set up through operation 720 (750).

As an example, after 8 second has elapsed from a point in time when the PGW 708 received a 180 ringing message, the PGW 708 may create and transmit dummy packets every 8 seconds. The PGW 708 may use at least one of the following: an event to receive a 200 OK message transmitted from the called party (755) and an event to receive a call decline message, e.g., an event to receive a 603 decline message, as a standard for determining a point in time when transmission of the message is stopped.

In the embodiment, the transmission address of the dummy packet created by the PGW 708 may use an address corresponding to the address included in the packet filter that has been transmitted to the UE 702.

When the dummy packet is transmitted to UE 702 through eNB 704, the UE 702 discards packets that are received through the packet filter set in operation 720. Meanwhile, PGW 708 may not create charge information for the dummy packets.

In another embodiment of the present disclosure, in order to keep the connection with UE, the UE may continuously create messages and transmit the messages to PGW. More specifically, UE may transmit an uplink packet filter to PGW so that packets transmitted from a specific address (or a combination of ports) can be discarded. In the embodiment, the UE may be UE at the calling party (calling UE).

After the calling UE transmits an invite message or when the calling UE receives a 180 ringing message and/or a 100 trying message from the called party, the UE periodically creates a packet corresponding to an address that may match with the installed uplink packet filter and transmits the packet to PGW. In the embodiment, the packet that may match with the uplink packet filter and is ignored or discarded by PGW is called a dummy packet. The packet transmission may cause the eNB not to perform the connection release, and PGW may directly discard packets received by the installed packet filter.

Figure 8:
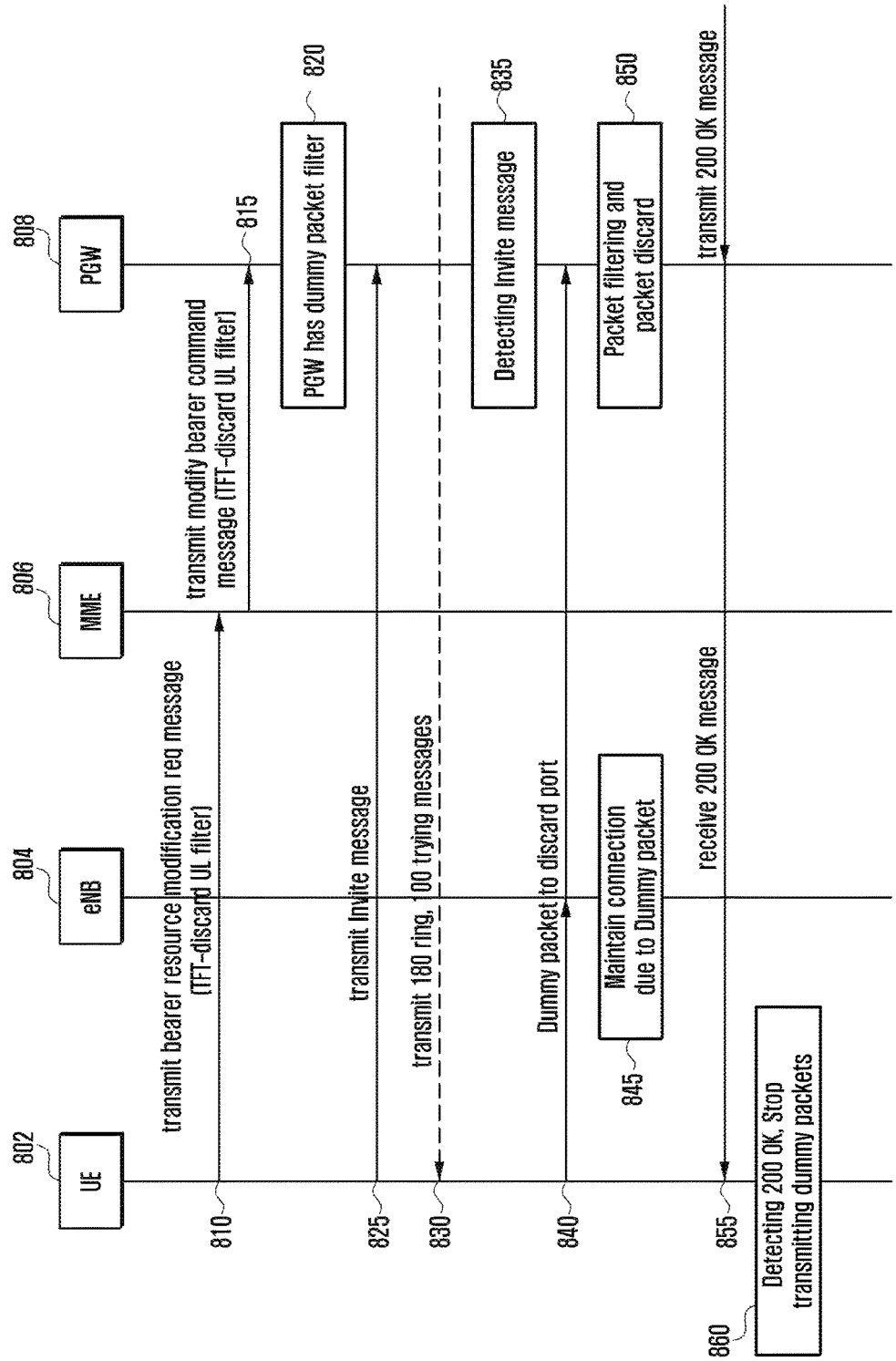
FIG. 8 is a signal flow chart that describes a method of transmitting messages, without interruption, by UE, to keep the connection, when a VoIMS call setup request is created, according to an embodiment of the present disclosure.

FIG. 8 is a signal flow chart that describes a method of transmitting messages, without interruption, by UE, to keep the connection, when a VoIMS call setup request is created, according to an embodiment of the present disclosure.

Referring to FIG. 8, at least one of the following entities: calling UE 802, eNB 804, MME 806, and PGW 808 may transmit/receive signals to/from the other entities.

In the embodiment, when a PDN connection or EPS bearer is formed for the UE 802 (810), the UE 802 creates a packet filter with a specific address (or a combination of ports) and may transmit the packet filter to the PGW 808 through the MME 806 and SGW (815).

The packet filter may include, when the PGW receives a matching packet, information for performing a discarding operation. For example, UE sets: the address of the packet filter to a preset address (e.g., 0.0.0.0.); the direction to uplink; and the report port to 9 (discard port), and may request the PGW 808 so that packets received through the address are all discarded. The packet filter may be included, as a TAD, in a message, bearer resource modification/addition request, transmitted to the MME 806. The MME 806 receives the packet filter and transmits the received packet filter to the PGW 808 through SGW (820). In the embodiment, the modify bearer command transmitted from the MME 806 to the SGW includes the same packet filter (TDA), and the SGW receives the packet filter and may transmit the same information to the PGW 808. Meanwhile, UE may obtain an address that will be used for the packet filter (e.g., IP address and port number) through Protocol Configuration Option (PCO) transmitted from the PGW. That is, when PDN connection or EPS bearer is formed, the PGW includes an address to be used for the packet filter in the PCO and transmits a message, create session response (when PDN connection is formed)/Create bearer request (when EPS bearer is formed) with the address. At the moment, the PCO may include a container ID indicating that UE needs to use a discard packet filter in the uplink direction as well as the address (e.g., IP address and port number). When the PCO is transmitted to MME through S-GW, the MME includes the PCO in an ESM NAS message (e.g., activate/modify EPS bearer context request) to be transmitted to UE and transmits the message to the UE. As described above, UE receives the PCO, and may determine that a discard packet filter for a specific address is required, based on information included in the PCO. Therefore, UE may create a discard packet filter creating request and transmit the request.

The PGW 808 may have or set a packet filter that may discard or ignore an uplink packet transmitted through a specific address (820). In the embodiment, when UE 802 has PDN connection or EPS bearer related to VoIMS, the UE 802 may also be applied to a method of creating and transmitting the packet filter.

When a VoIMS call is created, the UE 802 may transmit an invite message to called UE (825).

The UE 802 may receive at least one of the following: a 180 ringing message and a 100 trying message from the called UE (830).

The PGW 808 may detect the Invite message (835). The process of detecting the Invite message may be performed after at least one of operations 825 and 830.

When calling UE 802 recognizes that a call setup starts, the calling UE 802 may periodically create a packet corresponding to the packet filter and transmit the packet filter in order to keep the connection (840). In the embodiment, the packet that corresponds to the packet filter and is, if received by PGW 808, ignored or discarded by the PGW 808 may be called a dummy packet.

The eNB 802 that receives or transmits a message including the dummy packet may keep the connection with the UE 802 (845).

The PGW 808 may discard or ignore the dummy packet according to the set packet filter (850).

In the embodiment, the creation and transmission of the dummy packet by the calling UE 802 may start: after the calling UE 802 transmits an invite message or when the calling UE 802 analyzes a packet transmitted from the called UE and ascertains that the analyze packet is at least one of the following: a 180 ringing message and a 100 trying message. The UE 802 may periodically transmit the dummy packet, every a period of time, after a call has been set up and until the call starts. The period of time may be less than the initial value of the general inactivity timer of eNBs (e.g., 8 seconds).

For example, after 8 seconds have elapsed from a point in time when the UE 802 received a 180 ringing message, the UE 802 may periodically create and transmit messages every 8 seconds. The UE 802 may use at least one of the following: an event to receive a 200 OK message transmitted from the called party and an event to receive a call decline message, e.g., an event to receive a signal including a 603 Decline message, as a standard for determining a point in time when transmission of the message is stopped (855).

After receiving at least one of the 200 OK message and the call decline message, the calling UE 802 may stop transmitting the dummy packet (860).

The address for the dummy packet created by the UE 802 needs to use an address corresponding to the address included in the packet filter described above. When the message is transmitted to the PGW 808, the PGW 808 discards or ignores a packet received by the packet filter set in the previous process. Meanwhile, in the embodiment, the PGW 808 may not create charge information for the message.

In another embodiment of the present disclosure, in order to keep the connection with UE, an entity of an IMS network (e.g., CSCF) may continuously create messages and transmit the messages to UE. More specifically, when UE requests an outgoing call, the CSCF at the calling party periodically creates a message and transmits the message to the calling UE until the call has been set up. Since the message is transmitted to the UE through eNB, the connection with the UE may be kept. The message created by the CSCF may include a message that does not affect a call processing unit of the UE, e.g., a 180 ringing message.

Figure 9:
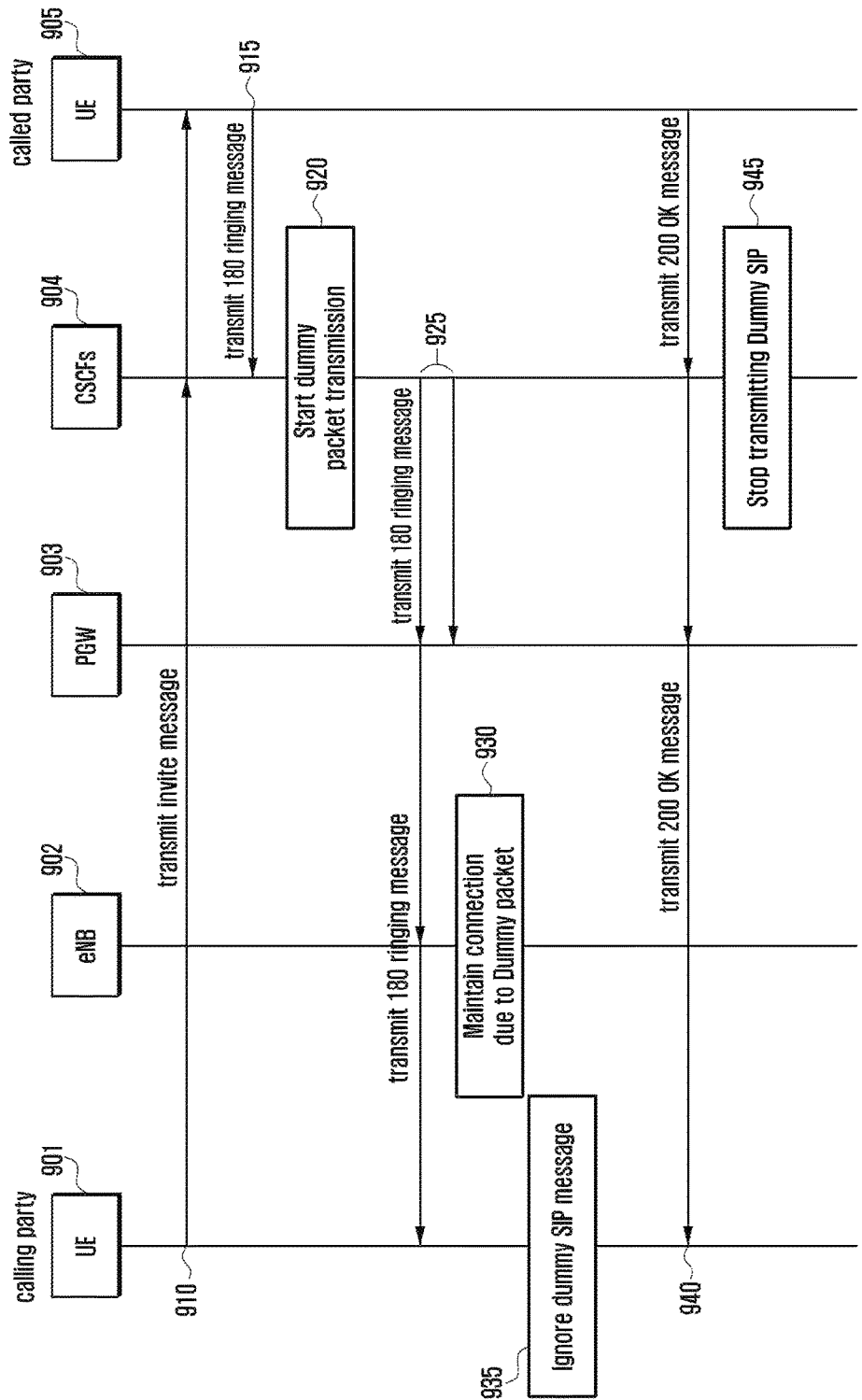
FIG. 9 is a signal flow chart that describes a method of transmitting messages, without interruption, by CSCF, to keep the connection, when a VoIMS call setup request is created, according to an embodiment of the present disclosure.

FIG. 9 is a signal flow chart that describes a method of transmitting messages, without interruption, by CSCF, to keep the connection, when a VoIMS call setup request is created, according to an embodiment of the present disclosure.

Referring to FIG. 9, calling UE 901, eNB 902, PGW 903, CSCF 904 and called UE 905 may transmit/receive signals to/from the other entities in the communication system.

When a VoIMS call is created, the calling UE 901 may transmit an invite message to the called UE 905 (910).

When the CSCF 904 recognizes that a call setup starts (915), it may periodically create a message to keep the connection with the calling UE 901 (920) and may transmit the created message to the calling UE 901 (925).

The recognition of a call setup by the CSCF 904 may be implemented with: a process where the CSCF 904 analyzes a packet transmitted from the calling UE 901 and ascertains that the analyzed packet is an invite message; or a process where the CSCF 904 analyzes a packet transmitted from the called UE 905 and ascertains that the analyzed packet is a 180 ringing message or 100 trying message.

The CSCF 904 may periodically transmit the message to the calling UE 901, every a period of time, after a call has been set up and until the call starts. The period of time may be less than the initial value of the general inactivity timer of eNBs 902 (e.g., 8 seconds).

For example, after 8 seconds have elapsed from a point in time when the CSCF 904 received a 180 ringing message, the CSCF 904 may periodically create and transmit messages every 8 seconds.

The CSCF 904 may use reception of at least one of the following: a 200 OK message and a call decline message, as a standard for determining a point in time when transmission of the message is stopped (940).

In the embodiment, the message created and transmitted by the CSCF 904 may include at least one of the status information providing messages such as a 180 ringing message and a 183 session in progress, so that the connection can be kept without affecting the operation of a call processing unit of the calling UE 901. In the embodiment, when the calling UE 901 receives a 180 ringing message or a 183 session in progress in multiple manner, it may ignore the received message so as not to affect a call processing.

Meanwhile, in another embodiment of the present disclosure, a method is proposed where a message created and transmitted by CSCF or PGW can be discarded by eNB before the message is transmitted to UE in order to keep the connection with the UE. The eNB is set with a policy so that, when the eNB receives a downlink packet with a GPRS Tunneling Protocol User plane (GTP-U) header including a specific marking, transmitted from S-GW, the eNB keeps the connection with the UE and discards the packet. Like the embodiments described above, when a VoIMS call setup is created from a calling UE, CSCF or PGW starts to create and transmit a 180 ringing message (by CSCF) or a specific packet (by PGW) in order to keep the connection state of the UE. When PGW transmits the packets to SGW, the PGW may include the specific marking information, described above, in the GTP-U. The packet with the GTP-U header including the same marking information is transmitted to the eNB through the S-GW. The eNB keeps the connection with the UE and discards the received packet without transmitting the packet to the UE, according to the set policy.

Figure 10:
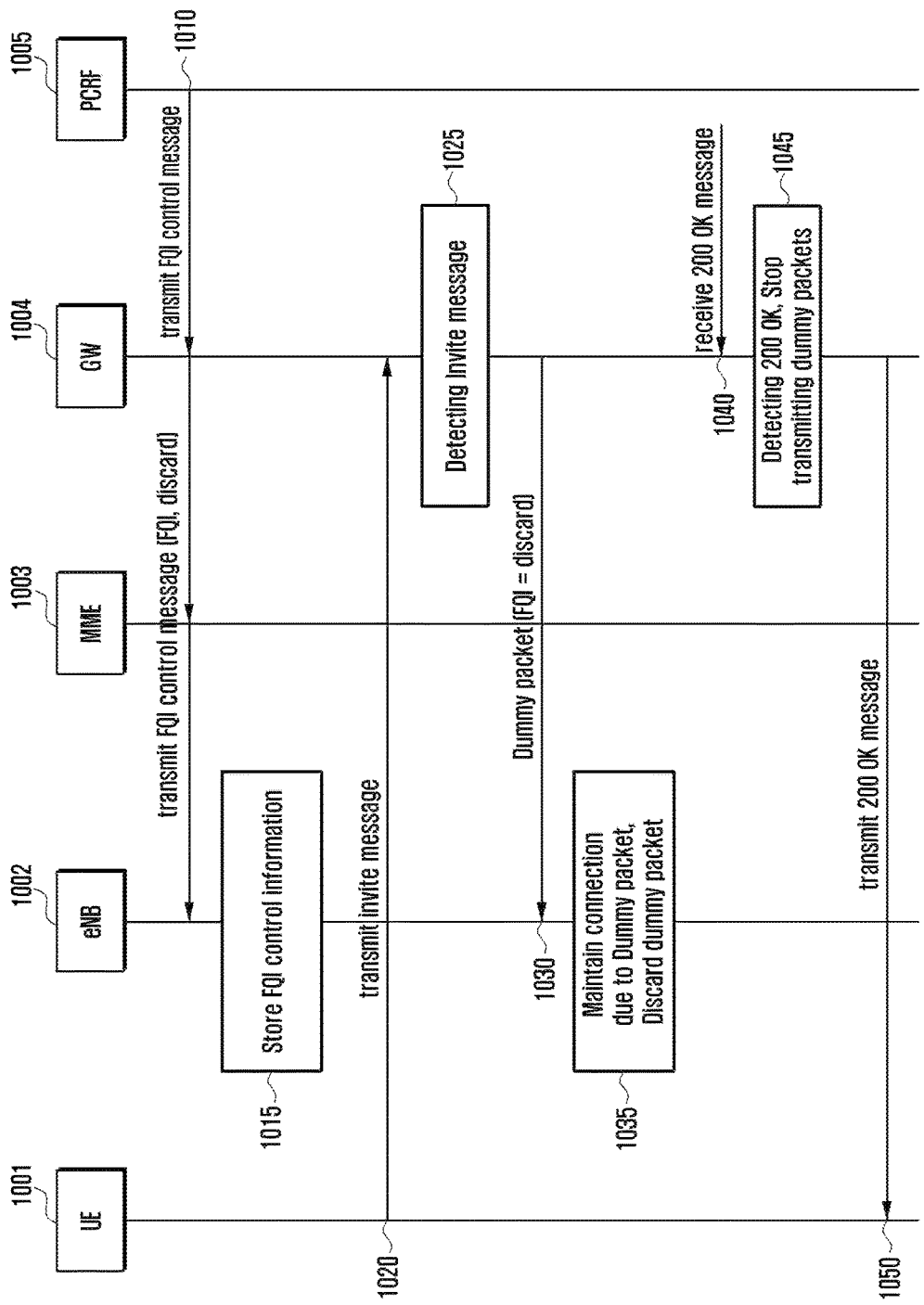
FIG. 10 is a signal flow chart that describes a method of continuously transmitting messages by an IMS or core network and discarding the messages by eNB in order to keep the connection when a VoIMS call setup request is created, according to an embodiment of the present disclosure.

FIG. 10 is a signal flow chart that describes a method of continuously transmitting messages by an IMS or core network and discarding the messages by eNB in order to keep the connection when a VoIMS call setup request is created, according to an embodiment of the present disclosure.

Referring to FIG. 10, the communication system according to the embodiment performs transmission/reception of signals among UE 1001, eNB 1002, MME 1003, gateway (GW) 1004 and PCRF 1005. The GW 1004 of the embodiment may include at least one of the PGW and SGW.

The eNB 1002 may be set with a policy (including FQI control information) (1015) so that, when the eNB 1002 receives a packet with a GTP-U header including specific marking information (1010), the eNB 1002 keeps the connection with UE that will receive the packet and discards the packet without transmitting the packet. The policy may be set through a Q&M method or may be created by a specific policy server (e.g., PCRF 1005) and then transmitted to the eNB 1002 through a core network node.

As the embodiment described above, when the UE 1001 requests a VoIMS call by an Invite message (1020), the entity (CSCF) of the IMS network or the entity (PGW) 1004 of the core network detects the Invite message (1025). The entity 1004 of the core network may periodically create a message and transmit the message to the calling UE 1001 in order to keep the connection with the calling UE 1001 (1030).

At the moment, if PGW 1004 analyzes packets created and transmitted by CSCF and recognizes a packet to keep the connection state from the analyzed packets or directly creates a packet to keep the connection state, the PGW 1004 includes specific marking information in the GTP-U header of the packet when the packet is transmitted to S-GW. The marking information needs to be set corresponding to the marking information applied to the policy set by the eNB 1002.

In the embodiment, when S-GW receives a packet including the marking information, the same marking information may be included in the header of the GTP-U message to be transmitted to the eNB 1002.

When the eNB 1002 receives a packet including the marking information in the GTP-U header, the eNB 1002 determines that activity for a destination UE 1001 exists (i.e., to maintain the connection state); however, the eNB 1002 may discard the real message without transmitting the real message to the UE 1001 (1035).

The PGW 1004 may receive at least one of the following: a 200 OK message and a call decline message such as a 603 Decline message from the called UE (1040).

The PGW 1004 may stop transmitting a packet with specific marking information to the eNB 1002, based on the received message (1045).

The PGW 1004 may transmit at least one of the received 200 OK message and the call decline message to the UE 1001 (1050).

In another embodiment of the present disclosure, when calling UE transmits an outgoing call to called UE, in order to keep the connection with the calling UE, UE may continuously create messages and also transmit the messages to the called UE. More specifically, after the calling UE transmits an invite message or when the calling UE receives at least one of the following: a 180 ringing message and 100 trying message from the called UE, the calling UE periodically transmits an SIP message that does not affect a call setup operation of the called UE to the called UE. This packet transmission causes the eNB not to release the RRC with the calling UE. The packet transmission also causes the called UE to process the SIP message transmitted from the calling UE, without altering the call status or the call setting by the SIP message.

Figure 11:
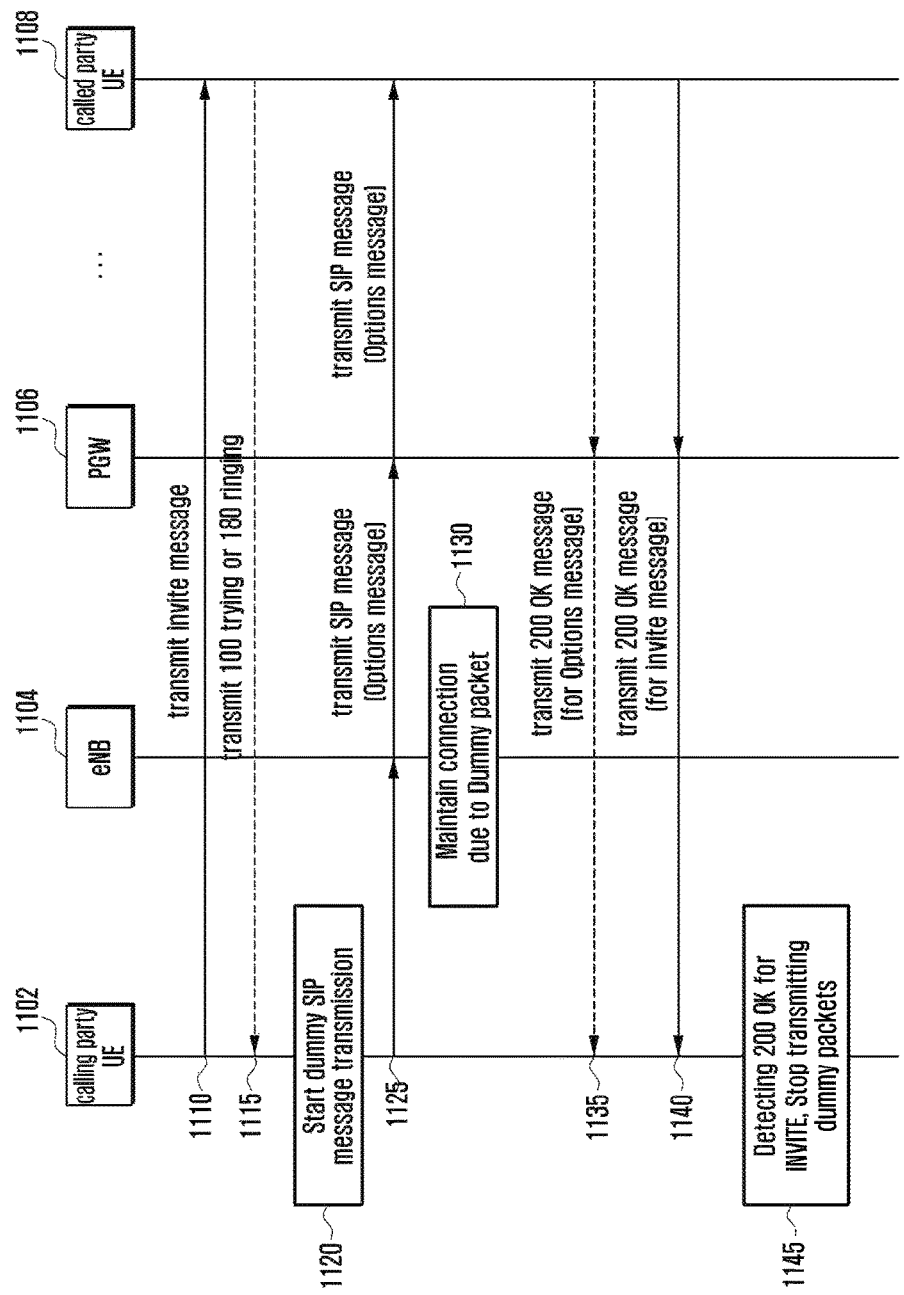
FIG. 11 is a signal flow chart that describes a method of continuously transmitting messages by UE in order to keep the connection when a VoIMS call setup request is created, according to an embodiment of the present disclosure.

FIG. 11 is a signal flow chart that describes a method of continuously transmitting messages by UE in order to keep the connection when a VoIMS call setup request is created, according to an embodiment of the present disclosure.

Referring to FIG. 11, at least one of the following entities: calling UE 1102, eNB 1104, PGW 1106 and called UE 1108 may transmit/receive signals to/from the other entities.

When a VoIMS call is created, the calling UE 1102 may transmit an invite message to the called UE 1108 (1110).

The calling UE 1102 may receive at least one of the following: a 180 ringing message and 100 trying message from the called UE 1108 (1115).

The calling UE 1102 may recognize whether a call setting is proceeding (1120). The recognition as to whether a call setting is proceeding may be determined based on at least one of the messages received in operation 1115. When the calling UE 1102 recognizes that a call setting is proceeding, the calling UE 1102 may start to periodically create an SIP message and to transmit the SIP message to at least one of the following: the called UE 1108 and a network node including the eNB 1104 in order to keep the connection. In the embodiment, the created and transmitted SIP message may be a message that does not affect a call setting process. In the embodiment, the SIP message that does not affect a call setting process may be called a dummy SIP message. According to embodiments, the dummy SIP message may include a message, OPTIONS, for detecting the capability between two entities. The transmission period of the SIP message may be set in various modes. The SIP message may be non-periodically transmitted.

The SIP message transmitted by the calling UE 1102 may be transmitted to the called UE 1108 through the network node including the eNB 1104 (1125).

The eNB 1104 that receives or transmits a message including the SIP message may keep the connection with the calling UE 1102 (1130). More specifically, the eNB 1104 may keep the connection with the calling UE 1102 by receiving the dummy SIP message from the calling UE 1102.

The calling UE 1102 may receive a 200 OK message, in response to the SIP message (e.g., OPTIONS), from the called UE or the network node that received the SIP message (1135).

In the embodiment, the creation and transmission of the dummy SIP message by the calling UE 1102 may start: after the calling UE 1102 transmits an invite message in operation 1110 and/or after the calling UE 802 analyzes a packet transmitted from the called UE and ascertains that at least one of the following: a 180 ringing message and a 100 trying message is received. In the embodiment, the calling UE 1102 may transmit the dummy SIP message after a call has been set up and until the call starts, every a period of time or non-periodically. The period of time may be less than the initial value of the general inactivity timer of eNB 1104 (e.g., 8 seconds).

For example, after 8 seconds have elapsed from a point in time when the calling UE 1102 received a 180 ringing message in operation 1115, the calling UE 1102 may periodically create the dummy SIP message and transmit the message to at least one of the following: the UE 1108 and the network node, every 8 seconds.

In addition, the calling UE 1102 may use at least one of the following: an event to receive a 200 OK message in response to the INVITE message transmitted from the called UE 1108 and an event to receive a call decline message from the called party, e.g., an event to receive a signal including a 603 Decline message, as a standard for determining a point in time when transmission of the message is stopped, (1140). More specifically, when the calling UE 1102 receives: the 200 OK message in response to the INVITE message from the called UE 1108; or a signal including the 603 decline message from the called UE 1108, the calling UE 1102 may stop transmitting the dummy SIP message.

When receiving at least one of the 200 OK message and the call decline message, the calling UE 1102 may stop transmitting the dummy SIP message (1145).

Meanwhile, in the embodiment described above or the foregoing embodiments where UE periodically or non-periodically transmits messages (or packets) in order to keep the connection, the transmission period of packets by UE may be set to the UE. For example, when eNB on a service provider network sets the initial value of the inactivity timer for UE to 10 seconds, the transmission period of message for keeping the connection with the UE delivered to the service provider may be to a value less than the initial value of the timer, e.g., 9 seconds. However, the setting of values of the timer may vary according to embodiments. In order to determine whether to apply the setting, UE may additionally determine whether HPLMN (Home PLMN, part of IMSI) of the UE is identical to PLMN of a service provider that is providing services.

As another method, UE may record a point in time that eNB releases the RRC and determine the transmission period of messages to keep the connection. More specifically, UE may store a time interval from a point of time that the latest packet was transmitted/received to a point of time that eNB released RRC connection (or received an RRC connection release message), and may estimate the initial value of the inactivity timer of the eNB based on the stored time interval. As the method described above, this method may keep the connection state, every a time interval less than the stored time interval, as a period. For example, when the stored time interval, taken to a point in time that RRC connection is released, is 10 seconds, UE may transmit a message to keep the connection, once every 9 seconds.

Meanwhile, UE may update a time interval from the latest packet transmission/reception to the RRC release with directionality with the latest time interval. The time interval may be calculated by computational methods such as average or moving average, etc.

Modules or programming modules according to the present disclosure may include one or more components, remove part of them described above, or include new components. The operations performed by modules, programming modules, or the other components, according to the present disclosure, may be executed in serial, parallel, repetitive or heuristic fashion. Part of the operations can be executed in any other order, skipped, or executed with additional operations.

Although exemplary embodiments of the invention have been described in detail above, it should be understood that many variations and modifications of the basic inventive concept herein described, which may be apparent to those skilled in the art, will still fall within the spirit and scope of the exemplary embodiments of the invention as defined in the appended claims.

What is claimed is:

1. A method for transmitting and receiving a signal by a base station of a mobile communication system, the method comprising:
   receiving, from a terminal, a first message for transmitting a call from the terminal to another terminal;
   transmitting, to a call control server, a second message based on the first message;
   receiving a third message related to a session initiation protocol; and
   identifying whether the third message includes a packet to maintain a connection with the terminal related to the call, the packet generated by the call control server at least one time,
   wherein the packet is ignored at the terminal when the third message includes the packet to maintain the connection with the terminal related to the call and at least two packets to maintain the connection with the terminal related to the call are received at the terminal.

2. The method of claim 1, wherein the receiving of the third message comprises receiving the packet related to the call generated by the call control server at least one time corresponding to at least one of the first message transmitted from the terminal, or a message transmitted from the other terminal in response to the first message.

3. The method of claim 1, wherein the receiving of the third message comprises receiving the third message including the packet related to the call generated by the call control server based on an inactivity timer value of the base station.

4. The method of claim 1, wherein the third message is not transmitted from the call control server based on whether the call control server receives a fourth message for accepting the call transmitted from the other terminal.

5. A base station in a mobile communication system, the base station comprising:
   a transceiver configured to transmit and receive signals; and
   at least one processor configured to:
   receive, from a terminal, a first message for transmitting a call from the terminal to another terminal, transmit, to a call control server, a second message based on the first message, receive a third message related to a session initiation protocol, and identify whether the third message includes a packet to maintain a connection with the terminal related to the call, the packet generated by the call control server at least one time, wherein the packet is ignored at the terminal, when the third message includes the packet to maintain the connection with the terminal related to the call and at least two packets to maintain the connection with the terminal related to the call are received at the terminal.

6. The base station of claim 5, wherein the at least one processor is further configured to receive the packet related to the call generated by the call control server at least one time corresponding to at least one of the first message transmitted from the terminal, or a message transmitted from the other terminal in response to the first message.

7. The base station of claim 5, wherein the at least one processor is further configured to receive the third message including the packet related to the call generated by the call control server based on an inactivity timer value of the base station.

8. The base station of claim 5, wherein the third message is not transmitted from the call control server based on whether the call control server receives a fourth message for accepting the call transmitted from the other terminal.

9. A terminal in a mobile communication system, the terminal comprising:

a transceiver configured to transmit and receive signals; and at least one processor configured to:

transmit, to a base station, a first message for transmitting a call to another terminal, receive, from the base station, a second message related to a session initiation protocol, identify whether the second message includes a packet to maintain a connection with the base station related to the call generated by a call control server at least one time, and ignore the packet, when the second message includes the packet to maintain the connection with the terminal related to the call and at least two packets to maintain the connection with the base station related to the call are received.

10. The terminal of claim 9, wherein the packet is generated by the call control server, corresponding to at least one of the first message transmitted from the terminal, or a message transmitted from the other terminal in response to the first message.

11. The terminal of claim 9, wherein the at least one processor is further configured to receive the second message based on an inactivity timer value of the base station.

12. The terminal of claim 9, wherein the second message is not transmitted from the base station based on whether the call control server receives a third message for accepting the call transmitted from the other terminal.

13. A method for transmitting and receiving a signal by a terminal, the method comprising:

transmitting, to a base station, a first message for transmitting a call to another terminal;

receiving, from the base station, a second message related to a session initiation protocol;

identifying whether the second message includes a packet to maintain a connection with the base station related to the call generated by a call control server at least one time; and ignoring the packet, when the second message includes the packet to maintain the connection with the terminal related to the call and at least two packets to maintain the connection with the base station related to the call are received.

14. The method of claim 13, wherein the packet is generated by the call control server, corresponding to at least one of the first message transmitted from the terminal, or a message transmitted from the other terminal in response to the first message.

15. The method of claim 13, wherein the receiving of the second message comprises:

receiving the second message based on an inactivity timer value of the base station.

16. The method of claim 13, wherein the second message is not transmitted from the base station based on whether the call control server receives a third message for accepting the call transmitted from the other terminal.

17. A base station of a mobile communication system, the base station comprising:

a transceiver configured to transmit and receive signals; and at least one processor configured to control the transceiver to:

receive, from a terminal, a first message for transmitting a call from a terminal to another terminal, and receive, from the terminal, a second message to maintain a connection with the terminal at least one time, wherein the second message is generated by the terminal related to the call, and the second message is transmitted to a network node, and wherein the second message is a non access stratum message including a cause of a discarding.

18. The base station of claim 17, wherein the at least one processor is further configured to receive the second message corresponding to at least one of the first message, or a message transmitted from the other terminal, in response to the first message.

19. The base station of claim 17, wherein the at least one processor is further configured to receive the second message based on an inactivity timer value of the base station.

20. The base station of claim 17, wherein the second message is not transmitted from the terminal based on whether the terminal receives a third message for accepting the call transmitted from the other terminal.

21. A terminal of a mobile communication system, the terminal comprising:

a transceiver for transmitting and receiving signals; and at least one processor configured to control the transceiver to:

transmit a first message, to a base station, for transmitting a call to another terminal, and transmit, to the base station, a second message generated by a terminal to maintain a connection with the base station at least one time, wherein the second message is related to the call and the second message is transmitted to a network node, and wherein the second message is a non access stratum message including a cause of a discarding.

22. The terminal of claim 21, wherein the at least one processor is further configured to transmit the second message corresponding to at least one of the first message, or a message transmitted from the other terminal, in response to the first message.

23. The terminal of claim 21, wherein the at least one processor is further configured to transmit, to the base station, the second message based on an inactivity timer value of the base station.

24. The terminal of claim 21, wherein the second message is not transmitted to the base station based on whether the terminal receives a third message for accepting the call transmitted from the other terminal.

* * * * *